(12) United States Patent
Udo et al.

(10) Patent No.: US 7,350,609 B2
(45) Date of Patent: Apr. 1, 2008

(54) VEHICLE FRONT END STRUCTURE

(75) Inventors: Tadashi Udo, Hiroshima (JP); Kazuma Kondou, Hiroshima (JP); Masanori Ogawa, Hiroshima (JP); Naoki Nagano, Hiroshima (JP); Takahide Ohhira, Hiroshima (JP); Kunio Takahashi, Hiroshima (JP)

(73) Assignees: DaikyoNishikawa Corporation, Hiroshima (JP); Mazda Motor Corporation, Hiroshima (JP)

( * ) Notice: Subject to any disclaimer, the term of this patent is extended or adjusted under 35 U.S.C. 154(b) by 262 days.

(21) Appl. No.: 11/150,289

(22) Filed: Jun. 13, 2005

(65) Prior Publication Data

US 2005/0279547 A1    Dec. 22, 2005

(30) Foreign Application Priority Data

| Jun. 16, 2004 | (JP) | ............................. 2004-177927 |
| Jun. 16, 2004 | (JP) | ............................. 2004-177931 |
| Jun. 16, 2004 | (JP) | ............................. 2004-178270 |

(51) Int. Cl.
*B60K 11/04* (2006.01)

(52) U.S. Cl. ............................... 180/68.4; 296/203.02

(58) Field of Classification Search ............... 180/68.4, 180/68.6, 68.3; 296/203.02
See application file for complete search history.

(56) References Cited

U.S. PATENT DOCUMENTS

| 5,219,016 | A  | * | 6/1993  | Bolton et al. .................. 165/41 |
| 6,196,624 | B1 | * | 3/2001  | Bierjon et al. ......... 296/193.09 |
| 6,347,823 | B1 | * | 2/2002  | Ozawa et al. .......... 296/193.09 |
| 6,412,855 | B1 | * | 7/2002  | Cantineau et al. ..... 296/187.01 |
| 6,502,653 | B1 | * | 1/2003  | Balzer et al. .............. 180/68.4 |
| 6,516,906 | B2 | * | 2/2003  | Sasano et al. ............. 180/68.4 |
| 6,540,284 | B2 | * | 4/2003  | Miyata .................. 296/203.02 |
| 6,543,525 | B2 | * | 4/2003  | Kalbacher .................... 165/140 |
| 6,578,650 | B2 | * | 6/2003  | Ozawa et al. .............. 180/68.1 |
| 6,622,806 | B1 | * | 9/2003  | Matsuura .................... 180/68.1 |
| 6,626,483 | B2 | * | 9/2003  | Ozawa et al. .......... 296/193.09 |
| 6,681,876 | B1 | * | 1/2004  | Haneda et al. ............. 180/68.4 |
| 6,708,790 | B2 | * | 3/2004  | Ozawa et al. .............. 180/68.4 |
| 6,742,615 | B2 | * | 6/2004  | Cristante et al. ........... 180/68.4 |
| 6,827,129 | B2 | * | 12/2004 | Ozawa et al. .................. 165/67 |
| 6,880,655 | B2 | * | 4/2005  | Suwa et al. ................. 180/68.1 |
| 6,973,984 | B2 | * | 12/2005 | Cheron et al. ............. 180/68.1 |
| 7,021,411 | B2 | * | 4/2006  | Maeda et al. .............. 180/68.4 |

(Continued)

FOREIGN PATENT DOCUMENTS

JP          5-12233          2/1993

(Continued)

*Primary Examiner*—Jeff Restifo
(74) *Attorney, Agent, or Firm*—Nixon Peabody LLP; Donald R. Studebaker

(57) ABSTRACT

In the case of mounting a liquid storage tank or an intake air resonator on a substantially frame-shaped resin shroud panel (1) with an opening (11*d*) in which a radiator (2) is disposed, the shroud panel (1) is integrally formed at its both lateral sides with body fastening parts (12, 12) which will be fastened to right and left front side frames (4, 4), respectively, and the body fastening parts (12, 12) are integrally formed on their outsides in the vehicle width direction with casing placement parts (15*a*, 16*a*) on which will be placed a casing (15) for a liquid storage tank and a casing (16) for an intake air resonator in proximity to the body fastening parts (12, 12), respectively.

11 Claims, 11 Drawing Sheets

U.S. PATENT DOCUMENTS

| | | |
|---|---|---|
| 7,044,246 B2 * | 5/2006 | Fujieda ................... 180/68.4 |
| 7,117,926 B2 * | 10/2006 | Mori et al. ................. 165/67 |
| 2002/0063003 A1 * | 5/2002 | Cristante et al. ........... 180/68.4 |
| 2003/0168270 A1 * | 9/2003 | Maeda et al. .............. 180/68.4 |
| 2004/0262061 A1 * | 12/2004 | Bahr et al. ................ 180/69.2 |
| 2006/0048924 A1 * | 3/2006 | Desai ...................... 165/148 |
| 2006/0086549 A1 * | 4/2006 | Smith et al. ............... 180/68.3 |
| 2007/0000705 A1 * | 1/2007 | Honzek et al. ............ 180/68.4 |
| 2007/0044938 A1 * | 3/2007 | Farley ...................... 165/41 |

FOREIGN PATENT DOCUMENTS

| | | |
|---|---|---|
| JP | 11-171041 | 6/1999 |
| JP | 2001-317357 | 11/2001 |
| JP | 2002-127940 | 5/2002 |
| JP | 2002-211252 | 7/2002 |

* cited by examiner right side    left side

VEHICLE FRONT END STRUCTURE

CROSS-REFERENCES TO RELATED APPLICATIONS

This application claims priority under 35 USC 119 to Japanese Patent Applications Nos. 2004-177927, 2004-177931 and 2004-178270, all filed on Jun. 16, 2004, the entire contents of which are incorporated herein by reference.

BACKGROUND OF THE INVENTION (a) Field of the Invention

This invention relates to a front end structure for a vehicle.

(b) Description of the Related Art

An example of known vehicle front end structures is disclosed in Japanese Unexamined Patent Publication No. H11-171041 (hereinafter, referred to as Document 1). With this vehicle front end structure, a resin shroud panel is previously formed with mounting parts for vehicle components such as a radiator, a condenser and a cooling fan, these vehicle components are subassembled on the shroud panel to form a module and the module is then assembled on a vehicle body, e.g., front side frames. Since subassembled components are assembled as a module on the vehicle body in this manner, this improves workability on a vehicle assembly line and reduces the number of assembly stations.

In the above vehicle front end structure, recesses are also formed in an upper shroud member located at the top of the shroud panel to open toward the rear of the vehicle and the recesses are covered to form closed spaces, thereby providing the shroud panel integrally with liquid storage tanks such as a radiator subtank and a window washer tank.

Likewise, with resonator-integrated fan shrouds as, for example, disclosed in Japanese Unexamined Patent Publication No. 2001-317357 (hereinafter, referred to as Document 2), a hollow box is formed integrally on a fan shroud (shroud panel) disposed around a cooling fan for a radiator and is used as an intake air resonator.

Front end structures are also known in which an air intake passage is provided above the head of the shroud panel. An example of the front end structures is disclosed in Japanese Unexamined Utility-Model Publication No. H05-12233 (hereinafter, referred to as Document 3). With an air intake passage of this front end structure, a resin sealing board is fitted on the top of a metal shroud upper that forms part of the vehicle body and an air intake passage communicating with an intake air duct is defined between the sealing board and a bonnet/hood located above. At both lateral ends of a portion of the sealing board corresponding to the intake air duct, a rib is formed to prevent water drops in the air led upward by vehicle structural members below the shroud upper from entering the air intake passage. Further, raised parts raised upward and open to front of the vehicle are provided on the top surface of the sealing board to trap water drops in intake air flowing toward the rear of the vehicle and lead out downward of the sealing board.

Another example is a front end structure disclosed in Japanese Unexamined Patent Publication No. 2002-211252 (hereinafter, referred to as Document 4). With an air intake passage of this front end structure, a vent hole is formed in a vertical wall of an upper panel of a resin shroud (referred to as a radiator core support upper panel in Document 4) to pass through the vertical wall in the front to rear direction of the vehicle. Further, an intake air duct faces the vent hole from behind, and a front rib is provided below the vent hole to extend toward the front of the vehicle. The front rib can guide outside air coming through a front grille to the vent hole of the upper panel and prevent water and snow from entering the intake air duct through the front grille when flooded or in snowfall.

Japanese Unexamined Patent Publication No. 2002-127940 (hereinafter, referred to as Document 5) discloses an example of known mounting structures for mounting heat exchangers including a radiator and a condenser on a support frame such as a shroud panel described above. In this mounting structure, vertically extending mounting rods are provided on respective ends of the top and bottom sides of a panel heat exchanger such as a radiator and the mounting rods are fixed to mounting holes through resin mounting members, respectively.

More specifically, the mounting member for fixing each mounting rod on the top side of the panel heat exchanger to the corresponding mounting hole of the support frame has a substantially cylindrical form. The mounting member has an insertion hole formed in the bottom surface to receive the mounting rod, a disk-like part formed on top of its cylindrical body, and circumferential slits formed in the cylindrical body and just below the disk-like part. The mounting hole is formed in a flat bracket extended from the upper member of the support frame toward the rear of the vehicle. The mounting member is fixed into the mounting hole by inserting the mounting member into the mounting hole and clamping a portion of the flat bracket around the edge of the mounting hole between the sidewalls of the slits.

SUMMARY OF THE INVENTION

With the front end structures described in Documents 1 and 2, the liquid storage tank or the resonator integral with the shroud panel vibrates, which causes the following problems.

A shroud panel is generally assembled with a radiator or the like of relatively heavy weight. When the radiator or the like vibrates by vibrations of the vehicle when running or by a force of excitation of the engine, the shroud panel also vibrates. Therefore, where the liquid storage tank is integrated into the shroud panel as in Document 1, the vibration of the shroud panel may be amplified by oscillations (resonance vibrations) of liquid in the tank. Likewise, where the casing for an intake air resonator is provided integrally with the shroud panel as in Document 2, the sound reducing effect of the resonator may be deteriorated because of vibrations of the shroud panel.

The present invention has been made in view of the above points and its main object is therefore to minimize adverse effects resulting from vibrations of the radiator or the like by contriving the layout in which a liquid storage tank or an intake air resonator is mounted on a resin shroud panel.

To attain the above object, the present invention focuses on that body mounting parts, which are placed at both lateral sides of the shroud panel and mounted on the vehicle body frame, are fixed to vehicle body side frames having extremely high rigidity and, therefore, casings for a liquid storage tank or an intake air resonator are placed in proximity to the outside ends of the body mounting parts, respectively.

More specifically, a first aspect of the present invention is directed to a vehicle front end structure in which a shroud panel is provided at the front end of a vehicle body and has an opening in which at least a heat exchanger is disposed. In this structure, the shroud panel comprises integral body mounting parts formed to both lateral sides of the opening to join with both side frames, respectively, of the vehicle body, and at least one of the body mounting parts is integrally formed, on the outside thereof in the vehicle width direction, with a casing placement part on which a casing is placed in proximity to the at least one body mounting part.

With the above structure, since the body mounting parts formed at both lateral sides of the shroud panel are joined to the side frames, respectively, of the vehicle body, casing placement parts formed on the outsides of the body mounting parts are substantially joined to the side frames of the vehicle body. Further, the side frames of the vehicle body have extremely high rigidity. Therefore, even if the radiator or the like vibrates by vibrations of the vehicle when running or by a force of excitation of the engine with accompanying vibrations of the entire shroud panel, the casing placement part for the liquid storage tank and the casing placement part for the intake air resonator do not vibrate so much. Hence, the liquid storage tank casing and the intake air resonator casing also do not vibrate so much.

As a result, according to the present invention, the vibration of the shroud panel can be restrained from being amplified by oscillations (resonance vibrations) of liquid in the liquid storage tank, and the drop in the sound reducing effect of the intake air resonator due to vibrations of the casing can be minimized.

Even though the problems of vibrations can be solved in the above manner, other problems occur when the head of the shroud panel is provided with an air intake passage. With a structure in which a sealing board is separately disposed on a shroud panel like the air intake passage disclosed in the above Document 3, the production cost is high. Further, water drops in intake air flowing through a passage between the sealing board and the bonnet/hood may be taken into the intake air duct over the rib on the sealing board. Therefore, it is difficult to say that this structure prevents the entry of water drops into the intake air duct well.

On the other hand, with the above structure as in Document 4, the front rib extending from below the vent hole toward the front of the vehicle can restrain the entry of water drops into the vent hole to a great degree. However, this structure cannot restrain water drops splashed back by the collision with the front face of the core of the radiator or the like from being carried into the vent hole by the air flow and therefore has room for improvement in this respect.

In contrast, in a second aspect of the present invention, a cylindrical air intake passage is provided in the head of the shroud panel to extend in the vehicle front to rear direction and a pendent baffle plate is provided below the front end of the air intake passage to extend in the vehicle width direction alongside and at least for the lateral diameter of the opening of the air intake passage, thereby restraining the entry of water drops into the intake air duct as much as possible.

More specifically, the second aspect of the present invention is directed to a vehicle air intake structure in which a shroud panel has an opening of substantially rectangular form in which at least a heat exchanger is disposed, the shroud panel is located behind a front grille of the vehicle, a head of the shroud panel is formed with an air intake passage that passes through the head in the front to rear direction of the vehicle, and an intake air duct faces the rear end of the air intake passage. Further, in this structure, the air intake passage is integrally formed in the head of the shroud panel to have a cylindrical shape extending in the front to rear direction of the vehicle, the head of the shroud panel is integrally formed below the front end of the air intake passage with a pendent baffle plate that extends in the vehicle width direction alongside and at least for the lateral diameter of an opening of the air intake passage while the intake air duct is connected to the rear end of the air intake passage, and an air introduction hole in the front grille is formed at least below the lower end of the baffle plate.

With the structure of the second aspect of the invention, since the air introduction hole of the front grille is formed below the air intake passage in the head of the shroud panel, water drops are hardly carried directly into the air intake passage by wind passing through the vent hole during vehicle running.

Further, the bottom wall of the cylindrical air intake passage blocks diagonally upward movement of the water drops carried by the air flow, like the front rib in the known art (Document 4). Therefore, this structure can restrain the entry of water drops into the air intake passage like the known art in Document 4.

Furthermore, since a pendent baffle plate is provided below the front end of the air intake passage to extend in the vehicle width direction alongside and at least for the lateral diameter of the opening of the air intake passage, water drops splashed back by the collision with the front face of the core of the heat exchanger are trapped on the rear surface of the baffle plate. Therefore, the splashed water drops can be effectively restrained from entering the air intake passage.

In addition, the rear end of the air intake passage is connected to the intake air duct. Therefore, in the unlikely event that water drops bypass the air intake passage, it can be certainly prevented that the water drops are taken into the intake air duct.

As a result, according to the second aspect of the invention, the entry of water drops into the intake air duct can be minimized.

Next, consideration is made of a structure for mounting a heat exchanger such as a radiator to the shroud panel described above. In an exemplary known structure disclosed in the above Document 5, the mounting member is fixed into the mounting hole of the flat bracket by inserting the mounting member into the mounting hole and clamping part of the flat bracket around the edge of the mounting hole between the sidewalls of the slits formed in the outer periphery of the mounting member. In short, the resin mounting member is tightly fitted with the flat bracket at a single vertical point of the mounting member.

Therefore, the mounting structure as in Document 5 has a problem that when a heavy-weight heat exchanger is mounted to the support frame, the fitting between the bracket of the support frame and the mounting member is likely to be unstable.

With the foregoing in mind, in a third aspect of the invention, the support frame has two brackets vertically spaced from each other and the mounting member is tightly fitted with the two brackets at two vertical points of the mounting member.

More specifically, a third aspect of the invention is directed to a mounting structure for a heat exchanger in which a heat exchanger is detachably mounted to a support frame such as the above-described shroud panel through a mounting member. In this mounting structure, the mounting member comprises a main body formed by making vertically extending first and second vertical walls intersect with each other, a lid that is integrally formed on top of the main body and has an operating part for angular movement of the mounting member, a cylindrical part that is integrally formed at the bottom of the main body to open downward and have a smaller diameter than the lid and fittingly receives a substantially cylindrical upper mounting part provided on the top side of the heat exchanger, and the first and second vertical walls have larger diametric dimensions than the outside diameter of the cylindrical part.

Further, the main body has upper slits formed at the same height toward the lid to extend radially inwardly from the outer peripheral ends of the first and second vertical walls and lower slits formed at the same height toward the cylindrical part and vertically away from the upper slits to extend radially inwardly from the outer peripheral ends of the first and second vertical walls.

On the other hand, a head of the support frame (shroud panel) has vertically spaced first and second brackets formed to extend toward the rear of the vehicle so that the first and second brackets correspond to the respective heights of the upper slits and lower slits of the mounting member.

Furthermore, the first and second brackets have substantially circular insertion holes, respectively, into which the cylindrical part of the mounting member can be inserted, each of the insertion holes is formed with first cutaways which are continuous with the insertion hole and into which the first vertical wall can be inserted and second cutaways which are continuous with the insertion hole and into which the second vertical wall can be inserted, and at least one of the top and bottom surfaces of at least one of the first and second brackets has a prominence formed in the circumferential middle between at least one adjacent pair of the first and second cutaways.

In mounting the mounting member having the above structure to the support frame, the cylindrical part at the bottom of the mounting member and the main body continued upward from the cylindrical part are inserted into the insertion holes in the first and second brackets of the support frame from above. In this case, the outer peripheral ends of the first and second vertical walls of the main body pass through the first and second cutaways continuous with each of the upper and lower insertion holes.

When the cylindrical part and the main body of the mounting member are inserted through the insertion holes of the first and second brackets in the above manner, the cylindrical part fittingly receives the upper mounting part of the heat exchanger positioned below the lower insertion hole. Then, in this position, the mounting member is angularly moved about its axis. Thus, the first bracket is clamped by the sidewalls of the upper slits and the second bracket is clamped by the sidewalls of the lower slits, thereby tightly fitting the mounting member with the support frame.

Further, when the mounting member is angularly moved in the above manner, the prominence provided on at least one of the top and bottom surfaces of at least one of the first and second brackets is slid over by an opposed sidewall of the corresponding slit and then engaged with the sidewall of the slit to restrain backward angular movement of the mounting member. Therefore, the mounting member is locked in place with respect to the first and second brackets, i.e., the support frame, also in terms of the direction of its angular movement.

As a result, according to the third aspect of the invention, the mounting member for mounting a heat exchanger to a support frame such as a shroud panel is tightly fitted with the upper and lower brackets at two vertically spaced points of the mounting member, which provides a stable mounting as compared with the known structure in which the mounting member is fitted with the flat bracket at a single vertical point of the mounting member.

Furthermore, the mounting member is inserted from above into the insertion holes in the upper and lower brackets of the support frame, the upper mounting part of the heat exchanger is received from below into the cylindrical part at the bottom of the mounting member, and the mounting member is then angularly moved by twisting its lid. Therefore, an easy assembly can be carried out like the known art.

Furthermore, when the mounting member is angularly moved, at least one of the upper and lower sidewalls of at least one of the slits snaps over the prominence provided on the opposed surface of the corresponding bracket and is then engaged with the prominence, which enables the mounting member to be always locked in place and gives a moderation to the assembly worker thereby improving workability.

In the third aspect of the invention, the first and second vertical walls of the main body of the mounting member preferably have different diametric dimensions. In this case, in inserting the mounting member into the insertion holes of the brackets of the support frame, the orientation of the mounting member about the axis of its angular movement can be adequately aligned.

Further, the first and second vertical walls of the main body of the mounting member are preferably substantially orthogonal to each other. In this case, the top sides (slit sidewalls) of the first and second vertical walls disposed orthogonally to each other can support substantially circumferentially evenly shared portions of each of the brackets with the two sets of slits of the mounting member fitted onto the two brackets of the support frame. Therefore, the mounting member can be tightly fitted with the support member with stability without the event of a tilt or the like with respect to its axis of angular movement.

Furthermore, the cylindrical part of the mounting member preferably fittingly receives an elastic member configured to enclose the upper mounting part of the heat exchanger. This effectively reduces vibrations transmitted from the heat exchanger through the support frame to the vehicle body.

Furthermore, at least one of the upper and lower slits of the mounting member is preferably formed with a rib extending substantially horizontally from the lower sidewall of the at least one slit. In this case, the contact area of the mounting member with the brackets is increased as compared with the known structure, which allows the mounting member to be fitted with the support frame with further stability.

A substantially horizontally extending rib may be formed between each adjacent side surfaces of the first and second vertical walls of the main body of the mounting member to connect therebetween. This improves the torsional rigidity of the mounting member.

As described so far, with the vehicle front end structure of the present invention, the liquid storage tank casing and the intake air resonator casing are placed on the resin shroud panel in proximity to the outsides of the body mounting parts to be fixed to the vehicle body side frames, respectively. Therefore, even if the radiator or the like vibrates by vibrations of the vehicle when running or by a force of excitation of the engine with accompanying vibrations of the entire shroud panel, this structure restrains the vibrations of the liquid storage tank and the intake air resonator thereby reducing their attendant adverse effects.

Furthermore, when the head of the shroud panel is provided with an air intake passage, a cylindrical air intake passage is provided in the head of the shroud panel to extend in the vehicle front to rear direction and a pendent baffle plate is provided below the front end of the air intake passage to extend in the vehicle width direction alongside and at least for the lateral diameter of the opening of the air intake passage. This restrains the entry of water drops into the intake air duct as much as possible.

Furthermore, since the mounting member for mounting a radiator or the like to the shroud panel or the like is tightly fitted into the insertion holes of the upper and lower brackets at two vertically spaced points of the mounting member, this provides a stable mounting and the assembly of the mounting member can be carried out easily like the known structure.

DETAILED DESCRIPTION OF THE INVENTION

A preferred embodiment of the present invention will be described below in detail with reference to the drawings. The following description of the preferred embodiment is merely illustrative in nature and is not intended to limit the scope, applications and use of the invention.

Figure 1:
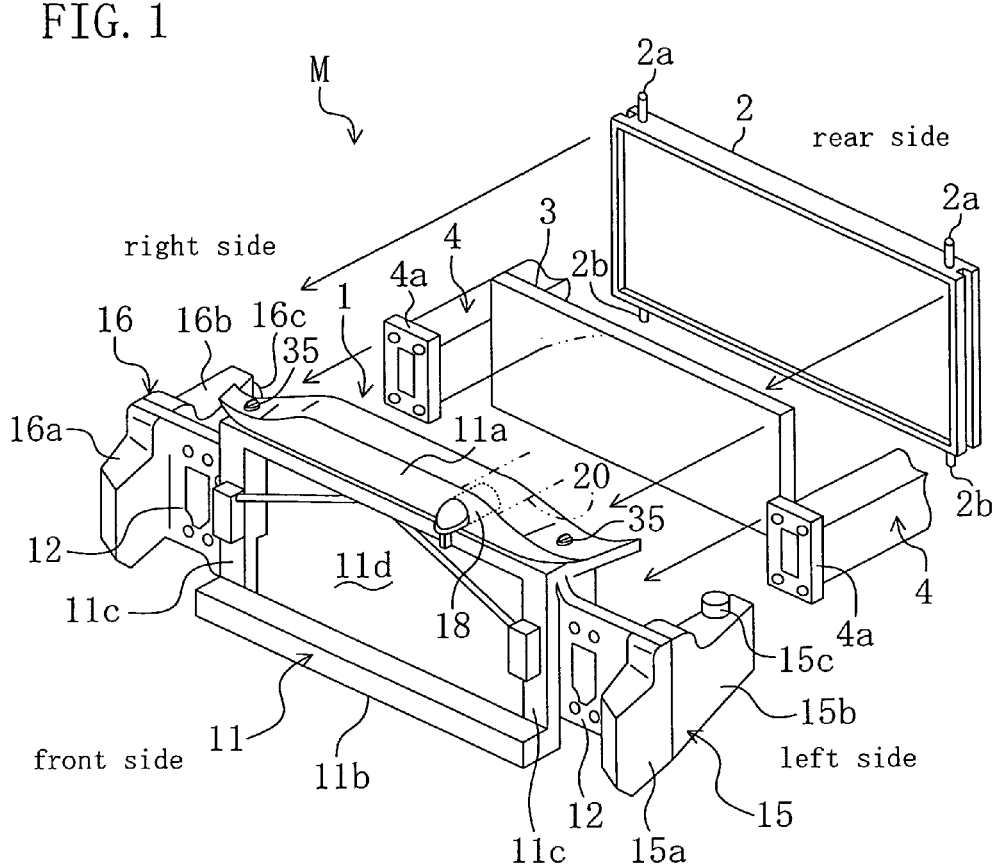
FIG. 1 is an exploded perspective view showing a front end module of a vehicle to which a vehicle front end structure according to an embodiment of the present invention is applied.

FIG. 1 is an exploded view of a front end module M of a vehicle to which a structure of the present invention is applied. This module M essentially consists of a resin shroud panel 1 in the form of a substantially rectangular frame, a radiator (heat exchanger) 2 for cooling a cooling water for an unshown engine using wind generated by running of the vehicle, a condenser (heat exchanger) 3 for an air conditioner placed in front of the radiator 2, and a cooling fan (not shown) mounted behind the radiator 2.

Figure 2:
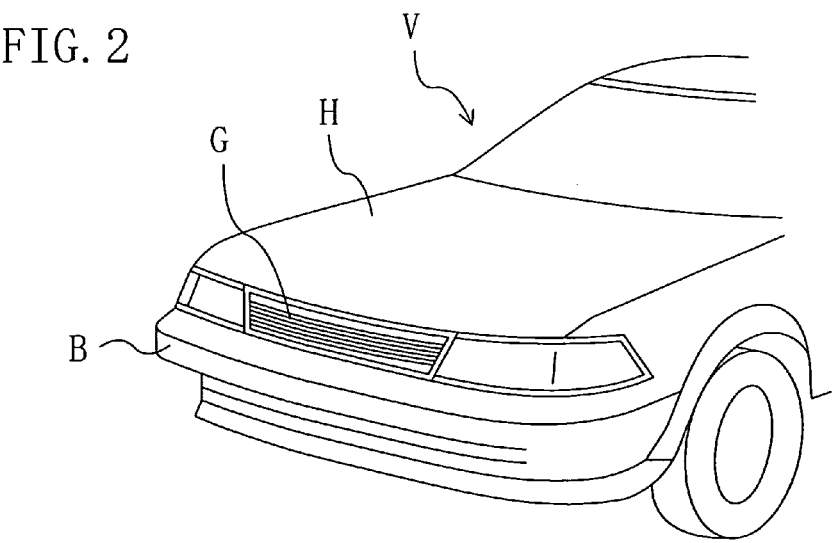
FIG. 2 is a view showing an exemplary front end of a vehicle.

The module M is placed behind (to the back of) a radiator grille G, a front bumper B or the like in the front end of a motorcar/automobile (vehicle) V shown as an example in FIG. 2, with the shroud panel 1 connecting the front ends of the right and left front side frames 4 and 4 (only their front portions are shown in FIG. 1).

Figure 3:
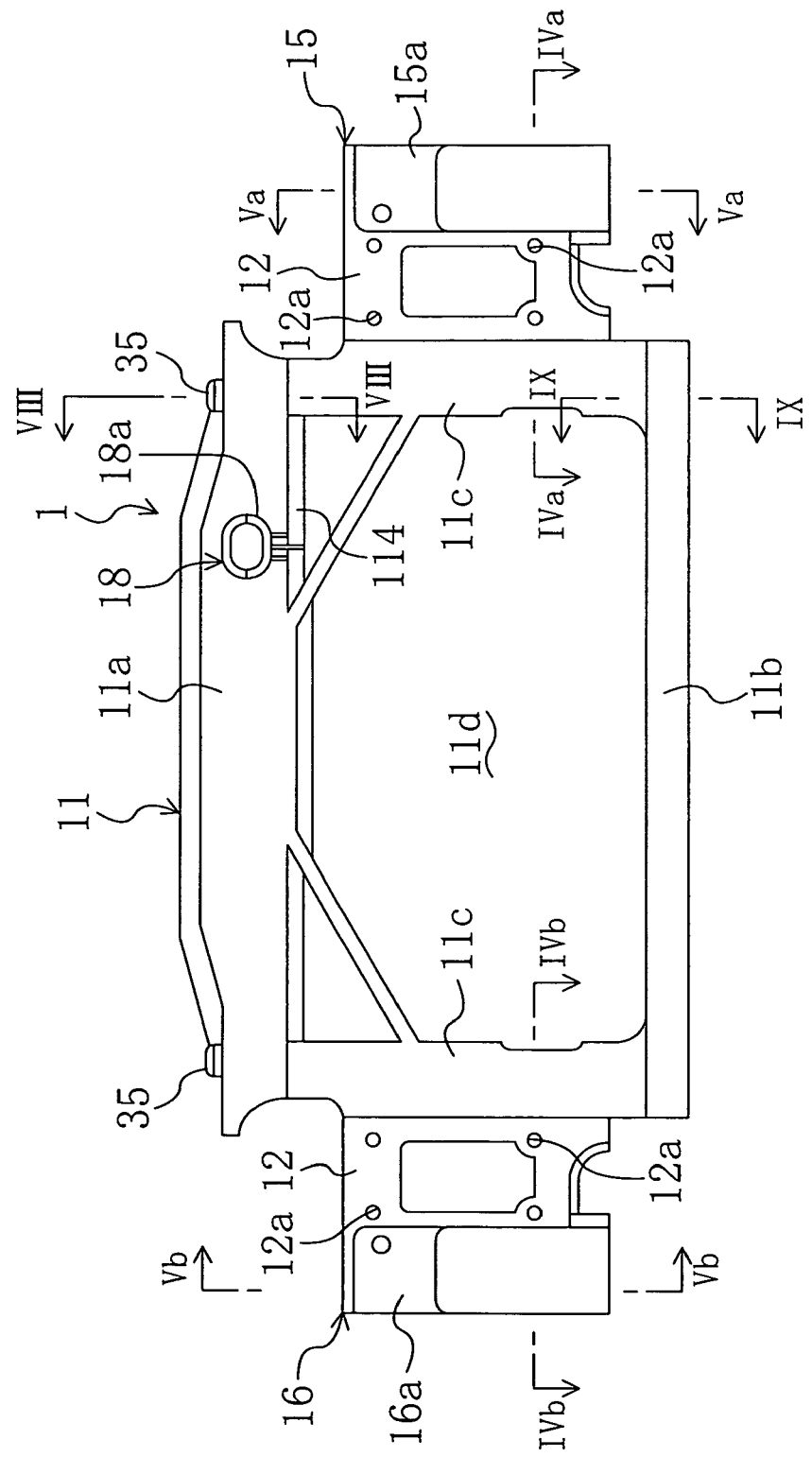
FIG. 3 is a front view of a shroud panel.

The shroud panel 1 is made of resin such as polypropylene reinforced with glass fibers. As also shown in FIG. 3, the shroud panel 1 has a radiator holder frame 11 for holding the radiator 2 (and the condenser 3), and body fastening parts (body mounting parts) 12 and 12, which are provided on both lateral sides, respectively, of the radiator holder frame 11 (both sides thereof in the vehicle width direction) and is to be fastened to front end flanges 4a and 4a of the right and left front side frames 4 and 4, respectively, of the vehicle body.

The radiator holder frame 11 has a head 11a and a sill 11b that are opposed vertically and extend in the vehicle width direction, and jambs 11c and 11c that connect both left ends and both right ends of the head 11a and the sill 11b to form a substantially rectangular frame corresponding to the outline of the radiator 2. The radiator 2 and the condenser 3 are placed so that the front faces of their cores face a substantially rectangular opening 11d surrounded by the frame members 11a to 11c.

Figure 4B:
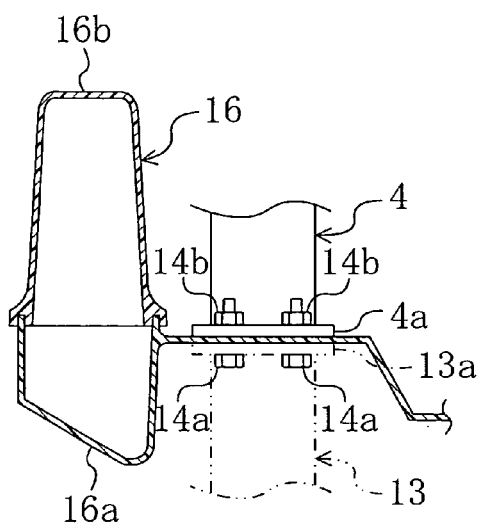
FIG. 4B is cross-sectional view taken along the line IVb-IVb of FIG. 3.

As also shown in FIG. 4, the right and left body fastening parts 12 and 12 have the form of plates extending from the right and left jambs 11c and 11c, respectively, outwardly in the vehicle width direction. Each of the body fastening parts 12 and 12 is sandwiched between a flange 13a of a corresponding one of crush parts 13 and 13 formed at both lateral ends of an unshown bumper reinforcement and the flange 4a of a corresponding one of the right and left front side frames 4 and 4, and fastened therebetween by bolts 14a, 14a and nuts 14b, 14b. Shown in FIG. 3 are bolt holes 12a, 12a, . . . that pass through the body fastening parts 12 to insert the shafts of the bolts 14a thereinto.

Casing Placement Part

A first feature of the present invention will be now described. The right and left body fastening parts 12 and 12 are integrally formed, on their outsides in the vehicle width direction, with casing placement parts 15a and 16a, respectively, on which a casing 15 for a liquid storage tank and a casing 16 for an intake air resonator are placed in proximity to the body fastening parts 12 and 12, respectively. In this embodiment, as shown not only in FIG. 4 but also in FIG. 5, the casing placement parts 15a and 16a constitute part of the casing 15 for a liquid storage tank and part of the casing 16 for an intake air resonator, respectively.

Figure 4A:
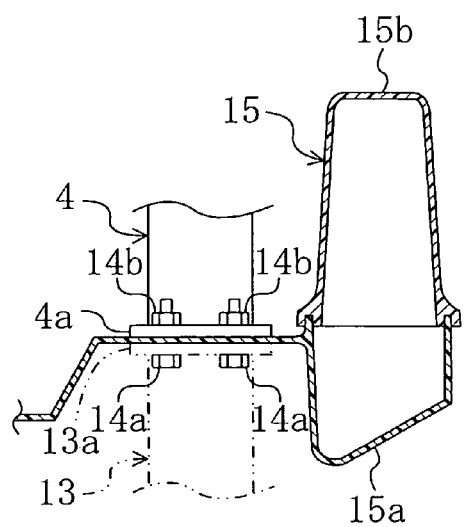
FIG. 4A is cross-sectional view taken along the line IVa-IVa of FIG. 3.
Figure 5A:
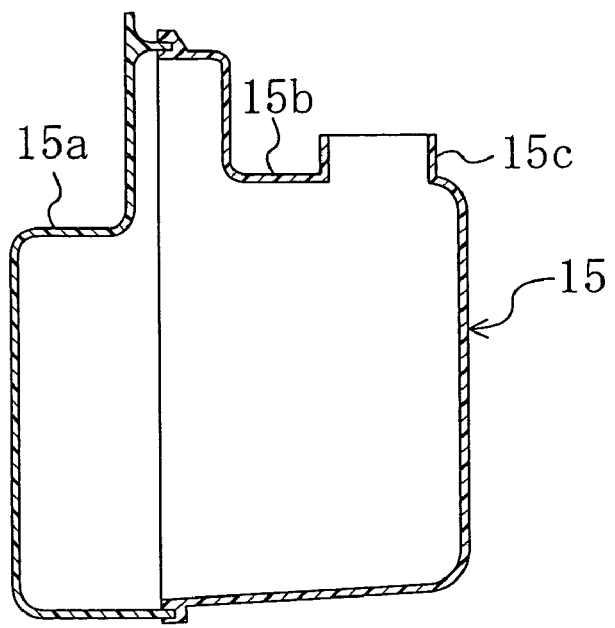
FIG. 5A is cross-sectional view taken along the line Va-Va of FIG. 3.

To be specific, as shown in FIG. 4A, the casing placement part 15a for the liquid storage tank casing 15 is continuous with one of the body fastening parts 12 of the shroud panel 1, and is formed into a container of substantially rectangular section that extends from the body fastening part 12 outwardly in the vehicle width direction, swells to the front of the vehicle and is open to the rear of the vehicle. The casing placement part 15a is assembled at its back side with a resin casing body 15b that is formed into a container of substantially rectangular section that is open to the front of the vehicle.

In this embodiment, the liquid storage tank is a window washer tank for storing a washer liquid for a front window washer (or otherwise may be a subtank for a radiator). As shown in cross sectional side view in FIG. 5A, a supply port 15c for the washer liquid is formed to extend upward from the top surface of the casing body 15b.

Figure 5B:
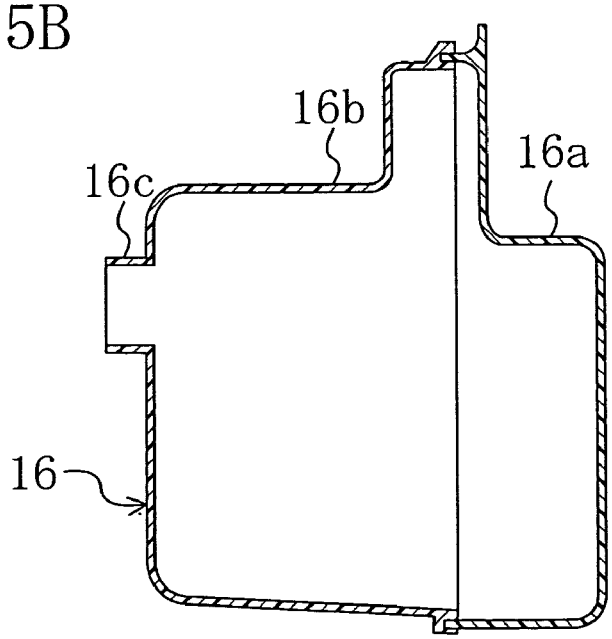
FIG. 5B is cross-sectional view taken along the line Vb-Vb of FIG. 3.

Likewise, the casing 16 for an intake air resonator shown in FIG. 5B consists of the casing placement part 16a integral with the other body fastening part 12 of the shroud panel 1 and a resin casing body 16b assembled at its back side with the casing placement part 16a. The intake air resonator casing 16 has substantially the same structure except that it does not have any supply port 15c as for the window washer tank casing 15 and that a connecting part 16c for an intake air duct is provided to extend from the back surface of the casing body 16b toward the rear of the vehicle.

In the casings 15 and 16, the opening ends of the casing bodies 15b and 16b have grooves formed along their opening perimeters, respectively. The opening ends of the casing placement parts 15a and 16a are fitted into the grooves and hermetically attached to them, respectively, as by vibration welding. In this manner, the casing placement parts 15a and 16a are integrated with the corresponding casing bodies 15b and 16b to form the casings 15 and 16, respectively.

With the above structure, since the body fastening parts 12 and 12 formed at both lateral sides of the resin shroud panel 1 are fastened to the right and left front side frames 4 and 4, respectively, of the vehicle body, the casing placement parts 15a and 16a formed on the outsides of the body fastening parts 12 and 12 are substantially joined to the right and left front side frames 4 and 4. Further, the right and left front side frames 4 and 4 have extremely high rigidity. Therefore, the above structure can effectively reduce the vibrations of the liquid storage tank casing 15 and the intake air resonator casing 16.

The reason for the above is as follows: The liquid storage tank casing 15 and the intake air resonator casing 16 are located more outside in the vehicle width direction than the body fastening parts 12 and 12, i.e., to the sides of the right and left front side frames 4 and 4 opposite the radiator 2, and located in proximity to the body fastening parts 12 and 12. Therefore, even if the radiator 2 or the condenser 3 vibrates by vibrations of the vehicle V when running or by a force of excitation of the engine with accompanying vibrations of the entire shroud panel 1, the liquid storage tank casing 15 and the intake air resonator casing 16 do not vibrate so much.

As a result, the vibration of the shroud panel 1 is hardly amplified by oscillations (resonance vibrations) of liquid in the liquid storage tank, and the drop in the sound reducing effect of the intake air resonator due to vibrations of the casing 16 can be minimized.

In this embodiment, the liquid storage tank is placed on the outside of the left body fastening part 12, while the intake air resonator tank is placed on the outside of the right body fastening part 12. However, either one of these tanks may be provided on the shroud panel 1, or two liquid storage tanks may be placed at both lateral sides thereof, respectively.

In this embodiment, for both the liquid storage tank and intake air resonator tank, the casing placement parts 15a and 16a constitute parts of walls of the casings 15 and 16, respectively. The present invention, however, is not limited to this and one or both of the casing placement parts 15a and 16a may be mounts on which the casings 15 and 16 are mounted.

Air Intake Passage

Figure 6A:
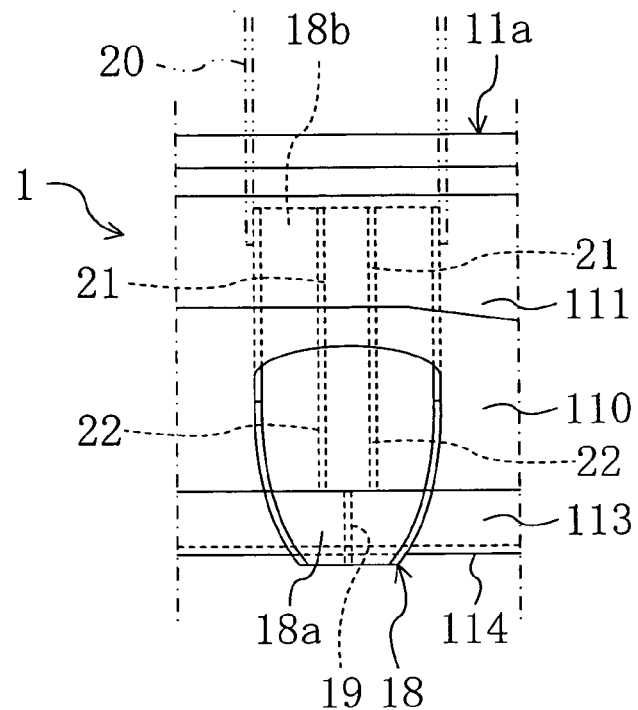
FIG. 6A is an enlarged plan of an air intake passage when viewed from above.
Figure 6B:
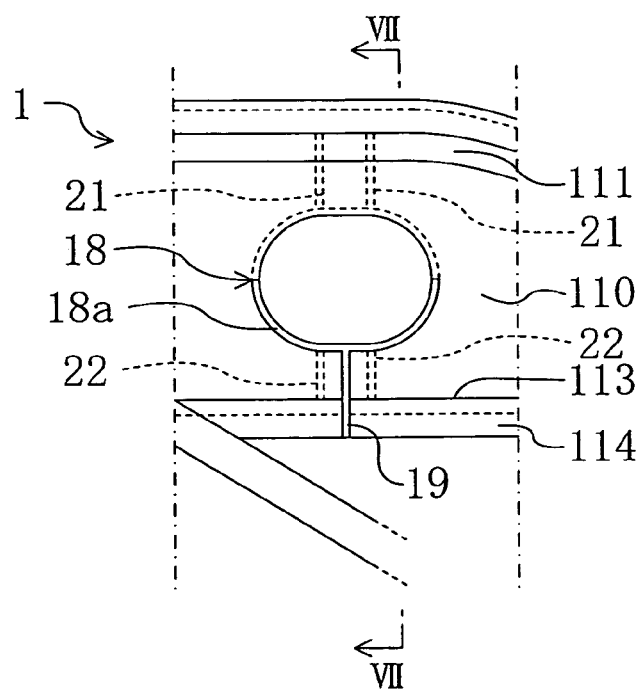
FIG. 6B is a front view of the air intake passage.
Figure 7:
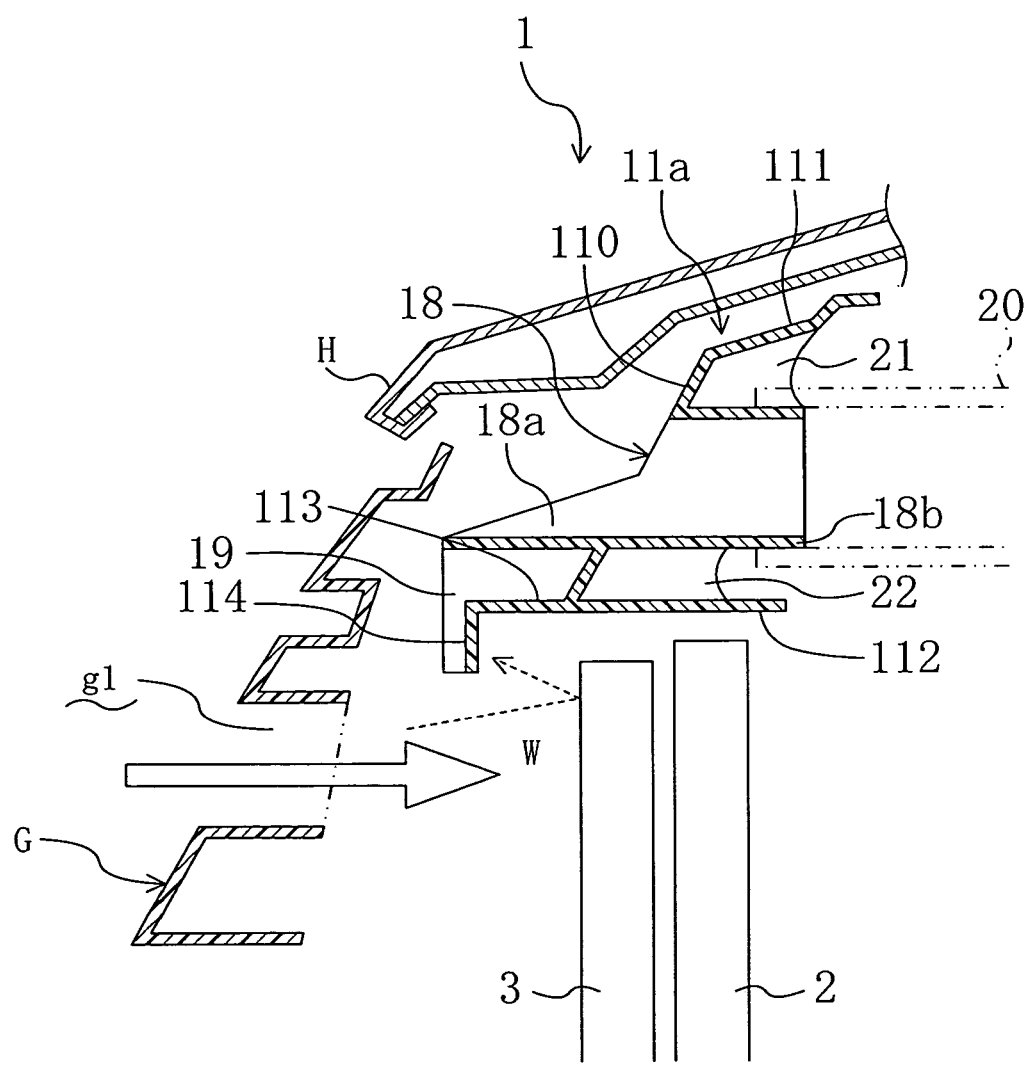
FIG. 7 is a cross-sectional view taken along the line VII-VII of FIG. 4B, showing the structure of the air intake passage.

Next, a second feature of the present invention will be described. As shown at higher magnification in FIGS. 6 and 7, a cylindrical air intake passage 18 for taking in air for the engine is integrally formed with the head 11a of the radiator holder frame 11 of the shroud panel 1. To be specific, the head 11a of the shroud panel 1 is formed, as shown in FIG. 7, to have the cross section of a substantially U shape that is open toward the rear of the vehicle. The head 11a of the shroud panel 1 has a vertical wall 110 inclined toward the rear of the vehicle so that its higher portions are closer to the rear of the vehicle, and top and bottom walls 111 and 112 that extend from the top and bottom ends, respectively, of the vertical wall 110 toward the rear of the vehicle.

Further, the head 11a is integrally formed with an extension wall 113 extending flush with the bottom wall 112 from the bottom end of the vertical wall 110 toward the front of the vehicle, and a pendent wall 114 that is bent down at the front end of the extension wall 113 and extends substantially perpendicularly downward. As shown in FIG. 3, the pendent wall 114 is formed to extend in the vehicle width direction all along the side of the opening 11d of the shroud panel 1 that is defined by the head 11a. This not only effectively restrains the entry of water drops into the air intake passage 18 as described later, but also improves the rigidity of the shroud panel 1.

Furthermore, the cylindrical air intake passage 18 is integrally formed with the head 11a to pass through the vertical wall 110 and extend in the front to rear direction of the vehicle. The air intake passage 18 has the cross section of an oval whose lateral diameter is longer than the vertical diameter when viewed in the front to rear direction in FIG. 6B. The upper half of the front opening end of the air intake passage 18 is flush with the front surface of the vertical wall 110, while the lower half thereof is formed along a lower wall 18a that extends from the front surface of the vertical wall 110 toward the front of the vehicle so that its lower portions are closer to the front of the vehicle. Since the lower wall 18a has the shape like a beak, it is hereinafter referred to as a beak-shaped wall.

The beak-shaped wall 18a extends frontward beyond the extension wall 113 of the head 11a. The bottom of the beak-shaped wall 18a is formed with a vertical rib 19 that extends from substantially the lateral middle of the bottom surface of the beak-shaped wall 18a to the opposed top surface of the extension wall 113 located below and that has a long dimension in the front to rear direction. The front end of the rib 19 extends along the front surface of the pendent wall 114 continued to the front end of the extension wall 113 down to the lower end of the pendent wall 114. The rear end of the rib 19 is continued to the vertical wall 110.

In other words, the beak-shaped part 18a, which is a front-end lower wall of the air intake passage 18, extends frontward from the head 11a of the shroud panel 1 to block the upward movement of water drops carried by the air flow. Further, the extension wall 113 of the head 11a is located below the beak-shaped wall 18a and the pendent wall 114 is provided to bend downward from the front end of the extension wall 113. The pendent wall 114 provides a baffle plate that extends downward from below the front end of the air intake passage 18 and that extends in the vehicle width direction alongside and at least for the lateral diameter of the opening of the air intake passage 18.

The rear end part of the air intake passage 18 extends rearward from the back surface of the vertical wall 110 of the shroud panel head 11a, and its rear end 18b is connected to an intake air duct 20 (shown in imaginary lines in FIGS. 6A and 7) communicating with an unshown intake line of the engine. Further, the rear end part of the air intake passage 18 is formed with a pair of ribs 21 and 21 that extend side by side in the front to rear direction and upward from the top surface of the rear end part thereof to the opposed bottom surface of the top wall 111 located above. Furthermore, the rear end part of the air intake passage 18 is also formed with a pair of ribs 22 and 22 that extend side by side in the front to rear direction and downward from the bottom surface of the rear end part thereof to the opposed top surface of the bottom wall 112 located below.

In FIG. 7, the reference character H denotes a bonnet/hood of the vehicle V, and the reference character g1 denotes an air introduction hole formed in the front grille G. In this embodiment, the air introduction hole g1 is formed below the lower end of the pendent wall (baffle plate) 114 of the head 11a of the shroud panel 1.

With the above air intake structure, the following advantages are obtained. First, the air intake passage 18 in the head 11a of the shroud panel 1 is located above and away from the air introduction hole g1 in the front grille G of the vehicle V. Therefore, even when water drops have been carried by wind created during vehicle running and passing through the air introduction hole g1 to enter the space located behind the front grille with as shown in the hollow arrow in FIG. 7, the water drops can hardly be carried directly to the air intake passage 18 to enter it.

Further, the beak-shaped wall 18a at the front end of the air intake passage 18 and the extension wall 113 of the shroud panel 1 extend frontward beyond the vertical wall 110 of the shroud panel 1, like the front rib in the known art (Document 4). Therefore, even if water drops having entered the space behind the front grille with wind created during vehicle running as described above tend to move upward with the air flow, the upward movement of water drops is blocked by the beak-shaped wall 18a and the extension wall 113, which also restrains the entry of water drops into the air intake passage 18.

Furthermore, the pendent wall 114 is provided below the beak-shaped wall 18a of the air intake passage 18 to extend in the vehicle width direction alongside and at least for the lateral diameter of the opening of the air intake passage 18. Therefore, water drops splashed back by the collision with the front face of the core of the condenser (heat exchanger) 3 are trapped on the rear surface of the pendent wall 114 as shown in the broken arrow W in FIG. 7, so that the water drops are not carried by the upward air flow in front of the air intake passage 18. In this manner, the splashed water drops can be effectively restrained from entering the air intake passage 18.

Furthermore, the rear end 18b of the air intake passage 18 is connected to the intake air duct 20. Therefore, in the unlikely event that water drops bypass the air intake passage 18, it can be certainly prevented that the water drops are taken into the intake air duct 20. Thus, the entry of water drops into the intake air duct 20 can be minimized.

Furthermore, in this embodiment, the air intake passage 18 is joined to the vertical wall 110, top wall 111, bottom wall 112 and extension wall 113 of the head 11a of the shroud panel 1 through the ribs 19, 21 and 22. In particular, the rear end part of the air intake passage 18 is joined to the top wall 111 through the pair of laterally juxtaposed ribs 21 and 21 and to the bottom wall 112 through the pair of laterally juxtaposed ribs 22 and 22. Therefore, these ribs enhance the rigidity of the rear end part of the air intake passage 18, and provide a holding member of sufficient bearing strength for the intake air duct 20 connected thereto In this embodiment, the front end part of the air intake passage 18 is formed of a downwardly extending beak-shaped wall 18a. The air intake passage in the present invention is not limited to the above structure but may have a simple cylindrical shape.

In this embodiment, the baffle plate for trapping water drops is formed of the pendent wall 114 bending down from the front end of the extension wall 113 of the head 11a. The baffle plate in the present invention is not limited to this but may be formed to extend downward directly from the bottom wall of the air intake passage 18.

Further, the ribs 19, 21 and 22 for joining the air intake passage 18 to the top wall 111 and bottom wall 112 of the head 11a are not always needed.

Furthermore, in this embodiment, the air introduction hole g1 of the front grille G of the vehicle V is formed fully below the lower end of the pendent wall 114. The position of the air introduction hole g1 is not limited to this, but part of the air introduction hole g1 may be above the lower end of the pendent wall 114.

Radiator Mounting Structure

Figure 8:
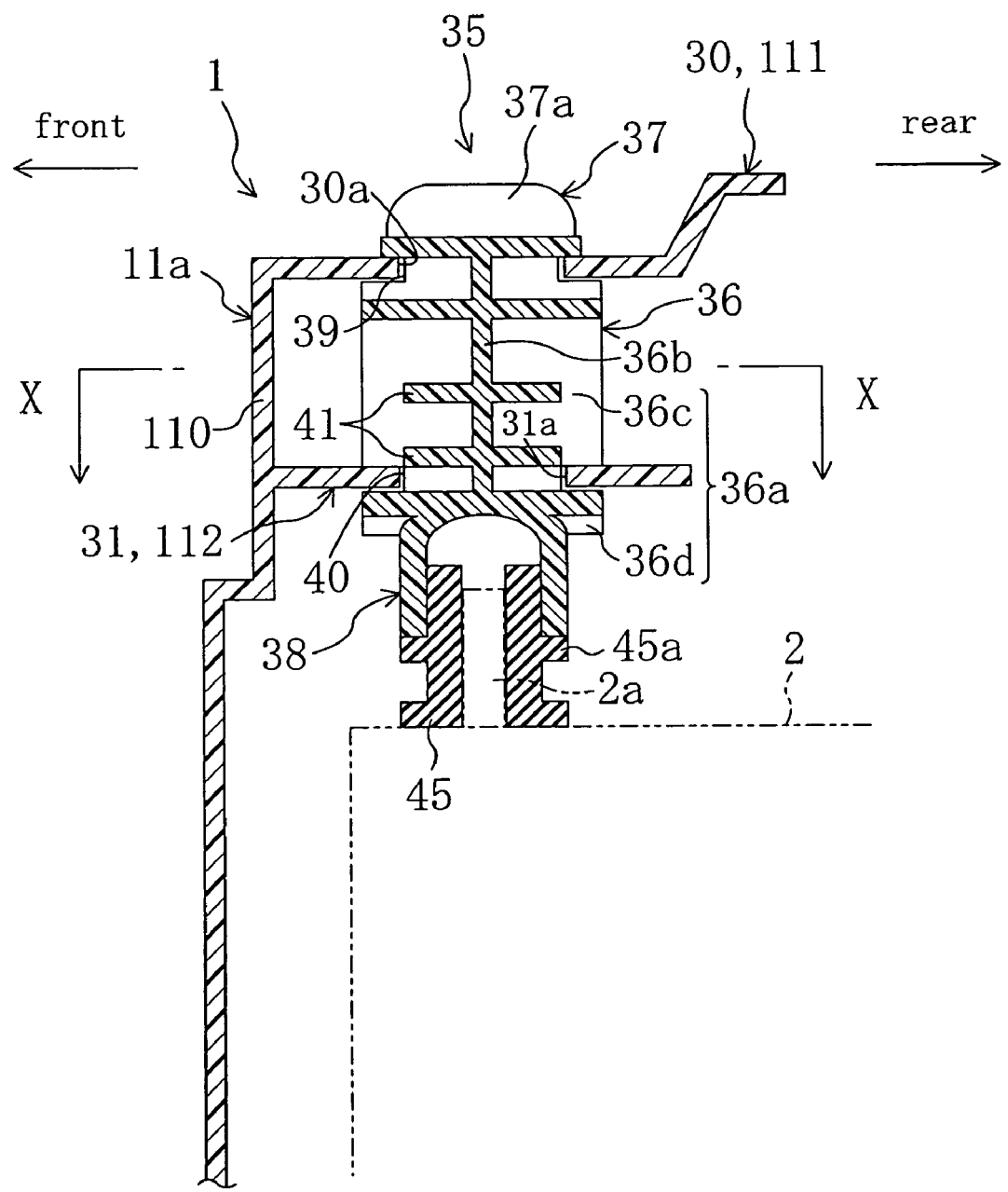
FIG. 8 is a cross-sectional view taken along the line VIII-VIII of FIG. 3, showing how an upper mounting part of a heat exchanger is mounted to a shroud panel.
Figure 9:
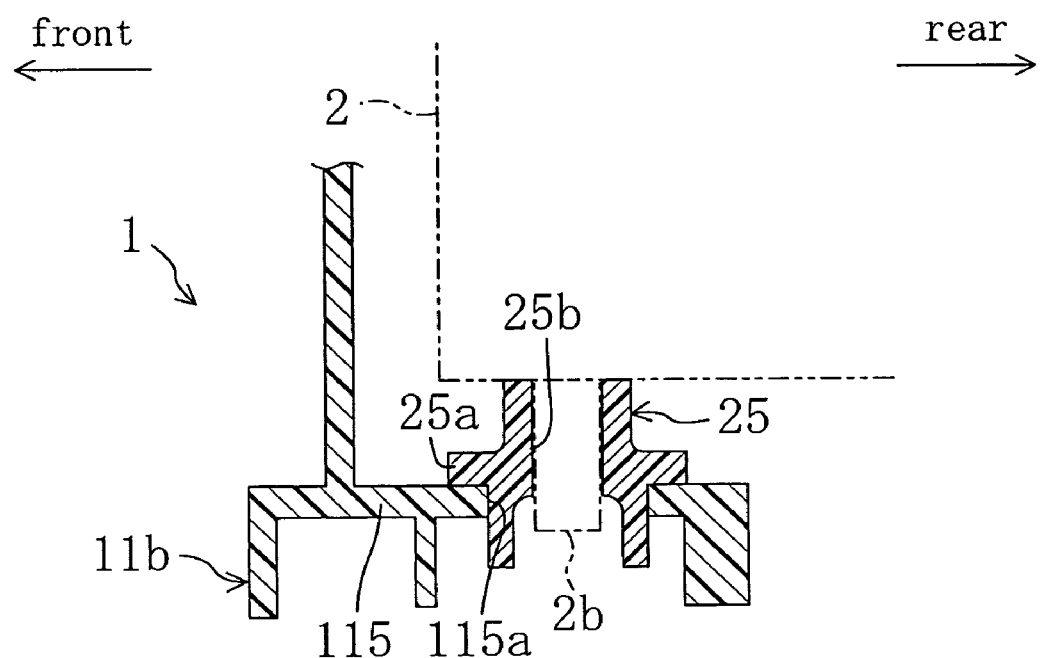
FIG. 9 is a cross-sectional view taken along the line IX-IX of FIG. 3, showing how a lower mounting part of the heat exchanger is mounted to the shroud panel.

Next, a specific structure for mounting the radiator 2 to the shroud panel 1 will be described. In this embodiment, the top side of the radiator 2 is formed at both lateral ends with upper mounting parts 2a and 2a, and the bottom side thereof is also formed at both lateral ends with lower mounting parts 2b and 2b. As shown in FIGS. 8 and 9, the upper mounting parts 2a and 2a are mounted to the head 11a of the shroud panel 1 through mounting members 35 and 35, respectively. Likewise, the lower mounting parts 2b and 2b are mounted to the sill 11b of the shroud panel 1 through mounting members 25 and 25, respectively.

More specifically, as shown in FIG. 9, the sill 11b of the shroud panel 1 has a floor 115 extending toward the rear of the vehicle. The floor 115 is formed with holes 115a of circular cross section for receiving mounting members 25 made of an elastic material (resin in this example shown in the FIG. 9). Each mounting member 25 has a substantially cylindrical shape and has a flange 25a formed around its outer periphery. When a portion of the mounting member 25 below the flange 25a is fully inserted into the hole 115a, the bottom surface of the flange 25a abuts the top surface of the floor 115a of the sill 11b. At this time, a cylindrical hole 25b of the mounting member 25 fittingly receives the lower mounting part 2b of the radiator 2.

Since the mounting member 25 made of an elastic material is placed between the lower mounting part 2b of the radiator 2 and the sill 11b of the shroud panel 1 in the above manner, this effectively restrains the transmission of vibrations of the radiator 2 to the vehicle body (such as the shroud panel).

On the other hand, the head 11a of the shroud panel 1 is formed to have the cross section of a substantially lateral U that is open toward the rear of the vehicle as described above. Further, at its both lateral ends shown in FIG. 8, the vertical wall 110 extends almost perpendicularly and the top and bottom walls 111 and 112 continued to the top and bottom of the vertical wall 11 extend almost horizontally toward the rear of the vehicle. Each of the top and bottom walls 111 and 112 of the head 11a is formed at its both lateral ends with holes for receiving mounting members 35 and 35, respectively. The top and bottom walls 111 and 112 function as brackets for mounting the radiator 2 to the shroud panel 1 through the mounting members 35 and 35. The top and bottom walls 111 and 112 are hereinafter referred to as a first bracket 30 and a second bracket 31, respectively.

In this regard, a third feature of the present invention is as follows. The head 11a of the shroud panel 1 is formed with the first and second brackets 30 and 31 for mounting the radiator 2 so that the brackets 30 and 31 are vertically spaced apart from each other and extend toward the rear of the vehicle. The corresponding lateral ends of the brackets 30 and 31 are formed with substantially circular insertion holes 30a and 31a, respectively. The first and second brackets 30 and 31 hold the upper mounting part 2a of the radiator 2 through the mounting member 35 inserted across both the insertion holes 30a and 31a.

Figure 12:
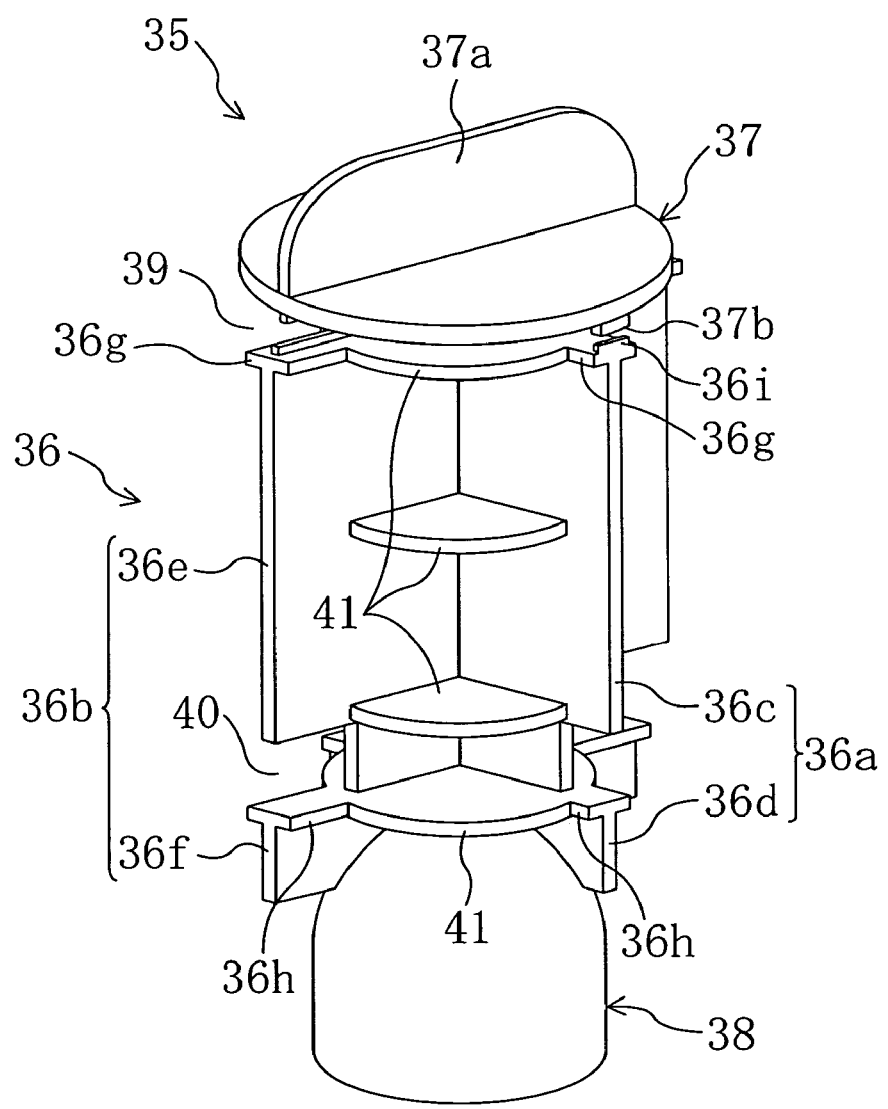
FIG. 12 is a perspective view showing the overall structure of the mounting member.

More specifically, as also shown in FIG. 12, each mounting member 35 has a main body 36, a substantially disc-shaped lid 37 on top of the main body 36, and a cylindrical part 38 formed at the bottom of the main body 36 to have a smaller diameter than the main body 36. The main body 36 comprises vertically extending, substantially plate-shaped first and second vertical walls 36a and 36b which are disposed substantially orthogonally to each other at the center (the axis of angular movement of the mounting member 35). The cylindrical part 38 is formed in the shape of a bell that is open downward, and receives the upper mounting part 2a of the radiator 2 enclosed with an elastic member 45 as described later.

Figure 13:
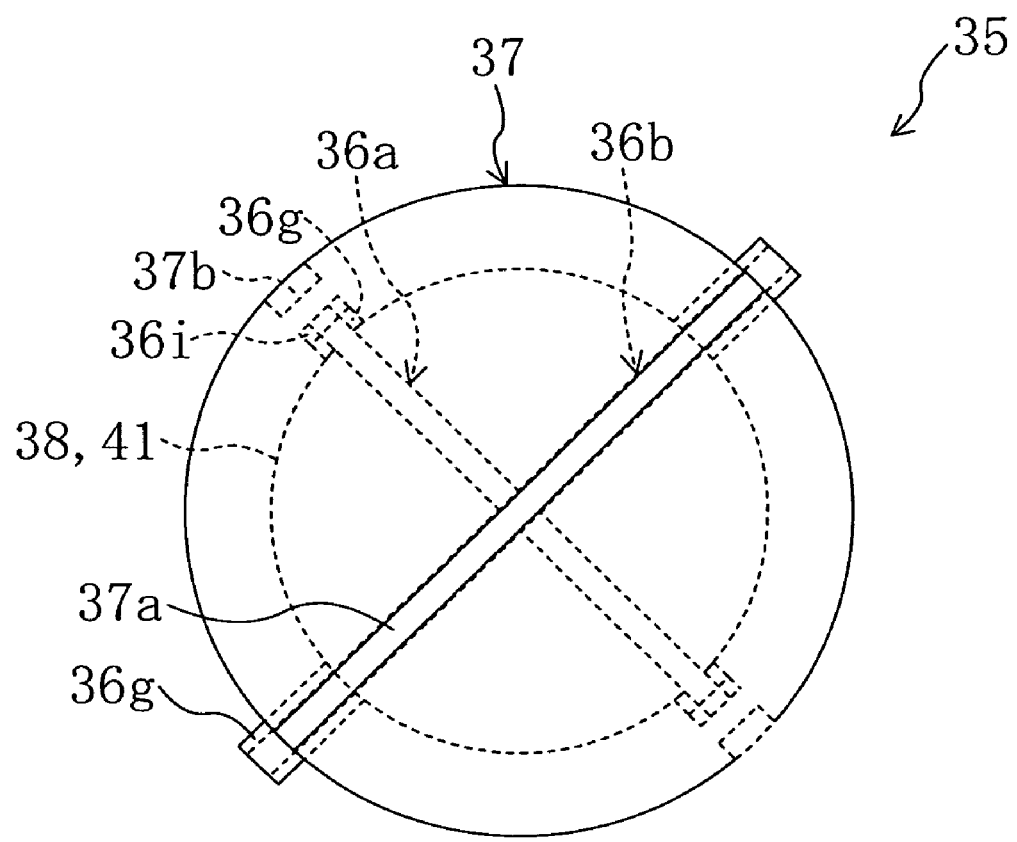
FIG. 13 is a top view of the mounting member.

The lid 37 at the top end of the mounting member 35, as shown in FIGS. 12 and 13, has an integral grip 37a provided to protrude from the top surface of the lid 37 and extend along the same plane as the second vertical wall 36b. The grip 37a functions as an operating part in angularly moving the mounting member 35.

Figure 10:
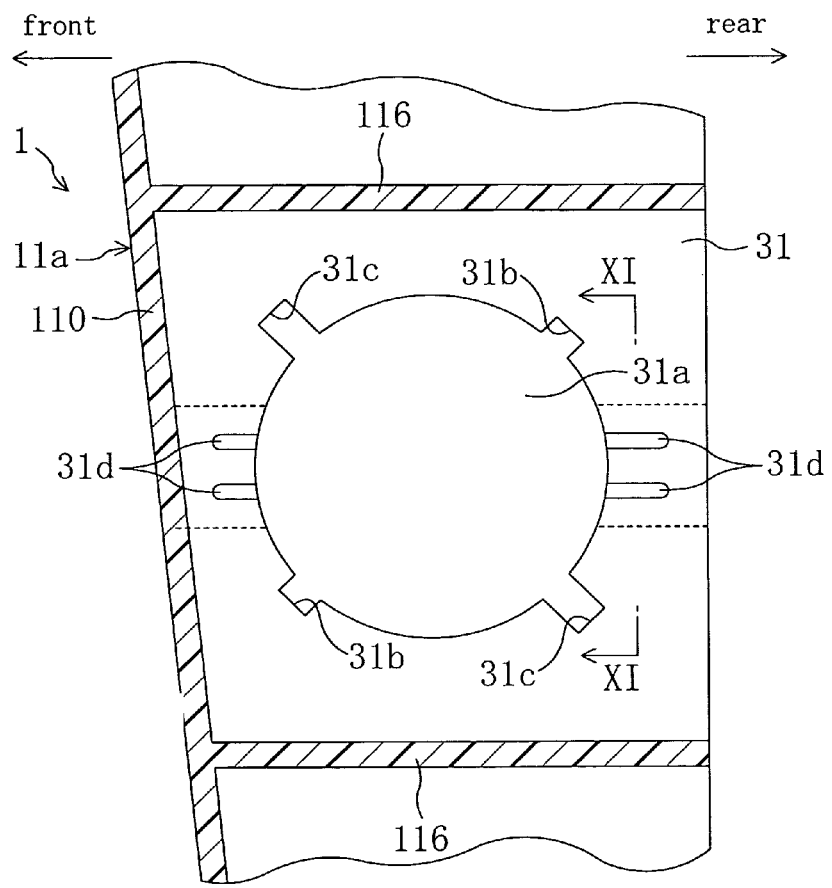
FIG. 10 is a cross-sectional view taken along the line X-X of FIG. 8, showing a second bracket to which a mounting member has not yet been fitted.
Figure 11:
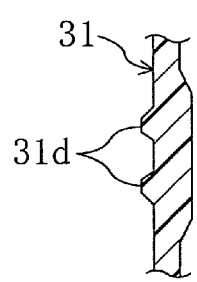
FIG. 11 is a cross-sectional view taken along the line XI-XI of FIG. 10, showing a locking part.

In the main body 36 between the lid 37 and the cylindrical part 38, as shown in FIGS. 10 and 11, the first vertical wall 36a has a diametric dimension smaller than the outside diameter of the lid 37, while the second vertical wall 36b has a diametric dimension greater than the outside diameter of the lid 37. Each adjacent side surfaces of the first and second vertical walls 36a and 36b of the main body 37 have a plurality of (four in this embodiment) vertically spaced sector ribs 41, 41, . . . formed to connect therebetween and have a radius almost equal to or smaller than the radius of the cylindrical part 38. Since the ribs 41, 41, . . . are thus provided between each adjacent side surfaces of the first and second vertical walls 36a and 36b, the main body 36 of the mounting member 35 has an improved torsional rigidity.

Further, the main body 36 has upper slits 39 formed at the same height toward the lid 37 (at the top) to extend radially inwardly from the outer peripheral ends of the first and second vertical walls 36a and 36b, and lower slits 40 formed at the same height toward the cylindrical part 38 (at the bottom) to extend radially inwardly from the outer peripheral ends of the first and second vertical walls 36a and 36b. When the mounting member 35 is fitted into the head 11a of the head 11a of the shroud panel 1, the slits 39 and 40 come to corresponding heights to the first and second brackets 30 and 31, respectively.

More specifically, the first vertical wall 36a is not continued to the lid 37, thereby forming the upper slits 39 between the first vertical wall 36a and the lid 37. Furthermore, the first vertical wall 36a is divided at its lower side into upper and lower parts 36c and 36d by the lower slit 40, while the second vertical wall 36b is divided at its lower side into upper and lower parts 36e and 36f by the lower slit 40.

Substantially horizontally extending ribs 36g, 36g, . . . are formed at the top ends of the first and second vertical walls 36a and 36b which face the upper slits 39 and form the lower sidewalls thereof. Likewise, substantially horizontally extending ribs 36h, 36h, . . . are formed at the top ends of the lower parts 36d and 36f of the first and second vertical walls 36a and 36b which face the lower slits 40 and form the lower sidewalls thereof.

As described above, the upper and lower slits 39 and 40 in the mounting member 35 are formed at their lower sidewalls with ribs 36g and 36h configured to abut the two brackets 30 and 31 of the shroud panel head 11a as described later. Therefore, the mounting member 35 can stably hold the brackets 30 and 31 in the slits 39 and 40 in sandwich relation.

As shown in FIG. 12, one of the upper slits 39 of the mounting member 35 is formed with opposed projections 37b and 36i extending from the bottom surface of the lid 37 and the top end of the first vertical wall 36a, respectively. The distance between the projections 37b and 36i is adjustable according to the thickness of the first bracket 30. Such projections 37b and 36i, however, may be dispensed with.

Each of the insertion holes 30a and 31a of the first and second brackets 30 and 31, into which the above mounting member 35 is inserted, has cutaways as shown in top view in FIG. 10. Since the two insertion holes 30a and 31a have the same shape, the following description will be made only with reference to the insertion hole 31a of the second bracket 31. As also shown in FIG. 8, the insertion hole 31a is formed with a diameter that is smaller than the outside diameter of the lid 37 of the mounting member 35 and that can pass the cylindrical part 38 therethrough.

More specifically, two first cutaways 31b and 31b are oppositely formed along and continuous with the periphery of the insertion hole 31a to allow the first vertical wall 36a of the mounting member 35 to be inserted through them, and two second cutaways 31c and 31c are also oppositely formed along and continuous with the periphery of the insertion hole 31a to allow the second vertical wall 36b of the mounting member 35 to be inserted through them. Since the diametric dimension of the first vertical wall 36a of the mounting member 35 is smaller than that of the second vertical wall 36b, the first cutaways 31b of the insertion hole 31a, as shown in FIG. 10, have a smaller cut depth than the second cutaways 31c. In FIG. 10, the reference numeral 116 denotes a vertical rib formed in the head 11a of the shroud panel 1 to connect between the first and second brackets 30 and 31.

With the above structure, when the top side of the radiator 2 is mounted to the head 11a of the shroud panel 1 through the mounting members 35, each upper mounting part 2a of the radiator 2 is first positioned in place below the insertion hole 31a of the second bracket 31 of the shroud panel head 11a as shown in FIG. 8. Then, the mounting member 35 is inserted, beginning at its bottom end, i.e., the cylindrical part 38, into the insertion holes 30a and 31a of the first and second brackets 30 and 31 from above.

At this time, part of the main body 36 of the mounting member 35 may lie off the peripheries of the insertion holes 30a and 31a. In this case, the first vertical wall 36a is aligned with the first cutaways 30b and 31b of the insertion holes 30a and 31a, while the second vertical wall 36b is aligned with the second cutaways 30c and 31c of the insertion holes 30a and 31a. In this relation, the first and second vertical walls 36a and 36b have different diametric dimensions and therefore must be inserted through the corresponding cutaways 30b (31b) and 30c (31c), respectively. Therefore, in inserting the mounting member 35 into the insertion holes 30a and 31a, the orientation of the mounting member 35 about the axis of its angular movement can be adequately aligned.

Then, when the cylindrical part 38 and the main body 36 of the mounting member 35 are inserted in this order through the insertion holes 30a and 31a of the first and second brackets 30 and 31, the lid 37 which is the uppermost part of the mounting member 35 cannot pass through the insertion hole 30a but abuts at its bottom surface on the top surface of the first bracket 30 and stops. At this time, the cylindrical part 38 of the mounting member 35 fittingly receives the upper mounting part 2a of the radiator 2 positioned below the insertion hole 31a together with the elastic member 45, as described above.

In this embodiment, the elastic member 45 is a substantially cylindrical rubber member and has a cylindrical hole for fittingly receiving the upper mounting part 2a of the radiator 2. The outer periphery of the elastic member 45 has a flange 45a formed in the vicinity of the vertical middle thereof. The flange 45a is configured to abut the bottom end of the cylindrical part 38 of the mounting member 35.

Since the elastic member 45 is thus interposed between the upper mounting part 2a of the radiator 2 and the resin mounting member 35, it can be prevented that the vibrations of the radiator 2 or the like are transmitted directly to the vehicle body (shroud panel 1). Further, since an upwardly biasing force (reaction force to compression) is applied to the mounting member 35 by the elastic member 45, the mounting member 35 can be more stably mounted to the shroud panel 1 by pressing it against the shroud panel 1 from below.

Furthermore, with the mounting member 35 thus mounted to the shroud panel 1, the ribs 36g, 36g, . . . , 36h, 36h, . . . forming the lower sidewalls of the slits 39, 39, . . . and 40, 40, . . . of the mounting member 35 abut the bottom surfaces of the first and second brackets 30 and 31 of the shroud panel 1. Therefore, the contact areas of the mounting member 35 with the brackets 30 and 31 are increased as compared with the case where no ribs 36g and 36h are provided, which allows the mounting member 35 to be fitted with the shroud panel 1 with further stability.

After inserted through the insertion holes 30a and 31a of the first and second brackets 30 and 31 as described above, the mounting member 35 is angularly moved while being pushed down against the biasing force from the elastic member 45. During the time, the first and second vertical walls 36a and 36b of the mounting member 35 move circumferentially along the peripheries of the insertion holes 30a and 31a, so that part of the first bracket 30 around the periphery of the insertion hole 30a and part of the second bracket 31 around the periphery of the insertion hole 31a are clamped within the upper and lower slits 39 and 40, respectively.

As shown in FIGS. 10 and 11, out of four portions of the top surface of the second bracket 31 corresponding to four circumferential intervals of the periphery of the insertion hole 31a each formed between adjacent first and second cutaways 31b and 31c, two portions thereof opposed in the vehicle front to rear direction each have a pair of parallel ridges (prominences) 31d and 31d extending from the peripheral edge of the insertion hole 31a in the vehicle front to rear direction. Therefore, when the lower slits 40 of the mounting member 35 are moved circumferentially with their sidewalls clamping the part of the second bracket 31 around the periphery of the insertion hole 31a, each of the upper sidewalls of an opposed pair of the slits 40, i.e., each of the undersides of the upper parts 36c of the first vertical wall 36, snaps over one of the pair of ridges 31d and 31d and is then lodged on part of the top surface of the second bracket 31 between the one ridge 31d and the other ridge 31d.

Since the sidewall of the slit 40 is thus engaged between the pair of ridges 31d and 31d, this restrains further angular movement of the mounting member 35 and also backward angular movement thereof from the engaged position. In other words, the pair of ridges 31d and 31d provides a locking part for locking the mounting member 35 in a predetermined position in terms of the direction of its angular movement. Since the locking part is thus formed of a pair of ridges 31d and 31d, an adequate moderation is given to the assembly worker when part of the vertical walls 36a and 36b snaps over the ridge 31d.

The pair of ridges 31d and 31d are not necessarily formed so that each one is symmetric with respect to the ridge line as shown in FIG. 11. Instead of this, the facing slopes (inside slopes) of the pair of ridges 31d and 31d may be steep and the slopes located outside of the ridge lines of the ridges 31d and 31d (outside slopes) may be gentler than the inside slopes, which allows the second vertical wall 36b to easily enter between the pair of ridges 31d and 31d.

With the above radiator mounting structure, the mounting member 35 is mounted to the head 11a of the shroud panel 1 with the upper mounting part 2a of the radiator 2 held in its cylindrical part 38, which makes it possible to detachably mount the radiator 2 to the shroud panel 1. Further, since the mounting member 35 is configured so that vertically spaced two sets of slits 39 and 40 formed in its main body 36 are tightly fitted onto two brackets 30 and 31 of the head 11a, a heavy-weight radiator 2 can be mounted to the shroud panel 1 with stability.

Furthermore, since the first and second vertical walls 36a and 36b of the mounting member 35 are disposed orthogonally to each other, they can support substantially circumferentially evenly shared portions of each of the brackets 30 and 31 with the two sets of slits 39 and 40 of the mounting member 35 fitting onto the two brackets 30 and 31, respectively. Therefore, the radiator 2 can be mounted to the shroud panel 1 with stability without the event of a tilt of the mounting member 35.

In the above embodiment, the first and second vertical walls 36a and 36b forming the main body 36 of the mounting member 35 are orthogonal to each other. The first and second vertical walls are not limited to this but need only intersect. Further, in the above embodiment, the two vertical walls 36a and 36b are substantially plate-shaped. Each of the vertical walls, however, may be bent partway or may be formed of a curved plate such as a plate with a substantially arcuate surface.

Furthermore, in the above embodiment, the first and second vertical walls 36a and 36b have different diametric dimensions. However, they may have the same diametric dimension. In this case, since it is necessary that the sidewalls of the slits 39 and 40 clamp the parts of the brackets 30 and 31 around the insertion holes 30a and 31a, their diametric dimension need be greater than the diameter of the insertion holes 30a and 31a.

In the above embodiment, as shown in FIG. 13, the grip 37a extends along the same plane as the second vertical wall 36b. However, the grip 37a may be formed to intersect the second vertical wall 36b in plan view or may be formed to extend in the same plane as the first vertical wall 36a. Further, the grip 37a may be formed crosswise in plan view.

Furthermore, in the above embodiment, ridges 31d and 31d are provided on the top surface of the second bracket 31 of the shroud panel 1 to form a locking part. The ridges 31d and 31d, however, may be provided on the bottom surface of the second bracket 31 or may be provided on at least one of the top and bottom surfaces of the first bracket 30. In other words, the pair of ridges 31d and 31d or other forms of prominence need only be formed on at least one of the top and bottom surfaces of at least one of the first and second brackets 30 and 31. In this case, when the mounting member 35 is mounted to the shroud panel 1, it is angularly moved while being pushed down as described above. Therefore, the prominence is preferably provided on the top surface of the first bracket 30 and/or the top surface of the second bracket 31.

What is claimed is:

1. A vehicle front end structure in which a shroud panel is provided at the front end of a vehicle body, the shroud panel having an opening in which at least a heat exchanger is disposed with the shroud panel holding the heat exchanger, wherein the shroud panel comprises right and left plate-shaped body mounting parts integrally formed to both lateral sides of the opening in the vehicle width direction to join with front end portions of both front side frames, respectively, the front side frames extending along the longitudinal direction of the vehicle body, and at least one of the right and left body mounting parts is integrally formed, on the outside thereof and opposite to the heat exchanger with the at least one of the body mounting parts interposed therebetween in the vehicle width direction, with a casing placement part on which a casing is placed in proximity to the at least one body mounting part.

2. The vehicle front end structure of claim 1, wherein the casing is a casing for a liquid storage tank.

3. The vehicle front end structure of claim 1, wherein the casing is a casing for an intake air resonator of an engine.

4. The vehicle front end structure of claim 1, wherein the body mounting parts of the shroud panel come into contact with and are fastened to the front end flanges of the vehicle body side frames.

5. A vehicle front end structure in which a shroud panel is provided at the front end of a vehicle body and has an opening in which at least a heat exchanger is disposed, wherein the shroud panel comprises integral body mounting parts formed to both lateral sides of the opening to join with both side frames, respectively, of the vehicle body, at least one of the body mounting parts is integrally formed, on the outside thereof in the vehicle width direction, with a casing placement part on which a casing is placed in proximity to the at least one body mounting part, the opening of the shroud panel in which at least a heat exchanger is disposed has a substantially rectangular form and the shroud panel is located behind a front grille of the vehicle, a head of the shroud panel is integrally formed with a cylindrical air intake passage that passes through the head and extends in the front to rear direction of the vehicle, the head of the shroud panel is integrally formed below the front end of the air intake passage with a pendent baffle plate that extends in the vehicle width direction alongside and at least for the lateral diameter of an opening of the air intake passage, while an intake air duct is connected to the rear end of the air intake passage, and an air introduction hole in the front grille is formed at least below the lower end of the baffle plate.

6. A vehicle front end structure in which a shroud panel is provided at the front end of a vehicle body and has an opening in which at least a heat exchanger is disposed, wherein the shroud panel comprises integral body mounting parts formed to both lateral sides of the opening to join with both side frames, respectively, of the vehicle body, at least one of the body mounting parts is integrally formed, on the outside thereof in the vehicle width direction, with a casing placement part on which a casing is placed in proximity to the at least one body mounting part, the shroud panel is formed in the shape of a frame with a substantially rectangular opening and has vertically spaced first and second brackets formed at a head of the frame-shaped shroud panel to extend toward the rear of the vehicle so that the heat exchanger is mounted at the top side thereof to the shroud panel through a mounting member fitted to the head of the shroud panel across both the two brackets, the mounting member comprises a main body formed by making vertically extending first and second vertical walls intersect with each other, a lid that is integrally formed on top of the main body and has an operating part for angular movement of the mounting member, a cylindrical part that is integrally formed at the bottom of the main body to open downward and have a smaller diameter than the lid and fittingly receives an upper mounting part provided on the top side of the heat exchanger, the first and second vertical walls have larger diametric dimensions than the outside diameter of the cylindrical part, the main body has upper slits formed at the same height toward the lid to extend radially inwardly from the outer peripheral ends of the first and second vertical walls and lower slits formed at the same height toward the cylindrical part and vertically away from the upper slits to extend radially inwardly from the outer peripheral ends of the first and second vertical walls, the difference between the height of the upper slits and the height of the lower slits corresponding to the distance between the first and second brackets, the first and second brackets of the head of the shroud panel have substantially circular insertion holes, respectively, into which the cylindrical part of the mounting member can be inserted, each of the insertion holes is formed with first cutaways which are continuous with the insertion hole and into which the first vertical wall can be inserted and second cutaways which are continuous with the insertion hole and into which the second vertical wall can be inserted, at least one of the top and bottom surfaces of at least one of the first and second brackets has a prominence formed in the circumferential middle between at least one adjacent pair of the first and second cutaways, and the first and second brackets are configured, when the mounting member is inserted through the insertion holes of the first and second brackets and then angularly moved to tightly fit parts of the first and second brackets around the insertion holes into the upper and lower slits, so that the prominence is slid over by an opposed sidewall of the corresponding slit and then engaged with the sidewall of the slit to restrain backward angular movement of the mounting member.

7. The vehicle front end structure of claim 6, wherein the first and second vertical walls of the main body of the mounting member have different diametric dimensions.

8. The vehicle front end structure of claim 6, wherein the first and second vertical walls of the main body of the mounting member are substantially orthogonal to each other.

9. The vehicle front end structure of claim 6, wherein the cylindrical part of the mounting member fittingly receives an elastic member configured to enclose the upper mounting part of the heat exchanger.

10. The vehicle front end structure of claim 6, wherein at least one of the upper and lower slits of the mounting member is formed with a rib extending substantially horizontally from the lower sidewall of the at least one slit.

11. The vehicle front end structure of claim 6, wherein a substantially horizontally extending rib is formed between each adjacent side surfaces of the first and second vertical walls of the main body of the mounting member to connect therebetween.

* * * * *